(12) United States Patent
Karim et al.

(10) Patent No.: US 8,129,688 B2
(45) Date of Patent: Mar. 6, 2012

(54) METHOD AND APPARATUS FOR A RADIATION DETECTOR

(76) Inventors: Karim S. Karim, Waterloo (CA); Amirhossein Goldan, Vancouver (CA)

( * ) Notice: Subject to any disclaimer, the term of this patent is extended or adjusted under 35 U.S.C. 154(b) by 237 days.

(21) Appl. No.: 12/357,577

(22) Filed: Jan. 22, 2009

(65) Prior Publication Data
US 2009/0184251 A1 Jul. 23, 2009

(30) Foreign Application Priority Data

Jan. 22, 2008 (CA) ...................................... 2615827

(51) Int. Cl.
*G01T 1/24* (2006.01)
(52) U.S. Cl. .................................................. 250/370.01
(58) Field of Classification Search .............. 250/370.01
See application file for complete search history.

(56) References Cited

U.S. PATENT DOCUMENTS
4,253,023 A   2/1981 Whited
(Continued)

FOREIGN PATENT DOCUMENTS
EP   1788632   5/2007

OTHER PUBLICATIONS

PCT International Searching Authority (CA), International Search Report and Written Opinion of the International Searching Authority for International Application No. PCT/CA2009/000077, Apr. 17, 2009.

*Primary Examiner* — David Porta
*Assistant Examiner* — Djura Malevic
(74) *Attorney, Agent, or Firm* — Jeffrey W. Wong; Borden Ladner Gervais LLP (57) ABSTRACT

The invention is directed at a radiation detector which includes a grid electrode located within the detector to assist in the charge collection process. The grid electrode is preferably embedded within a semiconductor layer between two electrode layers, one of the electrode layers being a charge collecting electrode and the other being a common electrode.

15 Claims, 14 Drawing Sheets

U.S. PATENT DOCUMENTS

| | | | |
|---|---|---|---|
| 4,472,728 A | 9/1984 | Grant et al. | |
| 4,577,322 A * | 3/1986 | Partin | 372/44.01 |
| 4,996,432 A | 2/1991 | Saitou | |
| 5,530,249 A * | 6/1996 | Luke | 250/374 |
| 5,627,377 A * | 5/1997 | Hamilton et al. | 250/370.13 |
| 5,677,539 A | 10/1997 | Apotovsky et al. | |
| 5,804,475 A * | 9/1998 | Meyer et al. | 438/172 |
| 5,886,353 A * | 3/1999 | Spivey et al. | 250/370.09 |
| 5,905,264 A * | 5/1999 | Shahar et al. | 250/370.01 |
| 6,043,495 A * | 3/2000 | Verger et al. | 250/370.01 |
| 6,069,360 A * | 5/2000 | Lund | 250/370.01 |
| 6,175,120 B1 * | 1/2001 | McGregor et al. | 250/370.13 |
| 6,218,668 B1 * | 4/2001 | Luke | 250/370.01 |
| 6,344,650 B1 | 2/2002 | Lee et al. | |
| 6,350,989 B1 * | 2/2002 | Lee et al. | 250/370.01 |
| 6,890,809 B2 * | 5/2005 | Karpov et al. | 438/200 |
| 7,271,395 B2 | 9/2007 | DeGeronimo | |
| 7,372,035 B2 * | 5/2008 | Yokoi et al. | 250/370.08 |
| 7,541,605 B2 * | 6/2009 | Takahashi | 250/580 |
| 7,608,830 B1 * | 10/2009 | Kinch | 250/370.06 |
| 7,649,177 B2 * | 1/2010 | Imai | 250/370.08 |
| 7,741,147 B2 * | 6/2010 | Kiesel et al. | 438/104 |
| 2004/0057556 A1 * | 3/2004 | Luhta et al. | 378/205 |
| 2007/0108398 A1 * | 5/2007 | Imai | 250/580 |

* cited by examiner

METHOD AND APPARATUS FOR A RADIATION DETECTOR

CROSS REFERENCE TO RELATED APPLICATIONS

This application claims the benefit of Canadian Patent Application No. 2,615,827, filed Jan. 22, 2008, which is incorporated herein by reference.

FIELD OF THE INVENTION

The invention is directly generally to single polarity charge sensing systems and more specifically to a radiation detector having a grid electrode located inside the detector.

BACKGROUND OF THE INVENTION

Wide band-cap radiation detectors operating at room temperature have been under development as an alternative for cryogenic detectors which exhibit excellent charge transport properties and unsurpassed energy resolution. Amongst these detectors, cadmium Telluride (CdTe) and cadmium Zinc Telluride (CdZnTe) are a few to have gone under extensive research and development because of their high resistivity for low leakage, high stopping power, and the ability to grow large crystals for pixilated two-dimensional (2D) array designs. However, these detectors suffer from poor charge transport properties which degrade their performance for gamma-ray spectroscopy. For example, the mobility-lifetime products for the holes in CdZnTe are typically an order of magnitude less than that of electrons. Thus, a full amplitude signal is generated only for complete charge collection due to the movement of fast electrons and slow holes, assuming negligible charge tapping.

In the case of CdZnTe, incomplete charge collection due to slow hole mobility results in depth-dependent signal variations such that the slow signal rise-time for the portion of the induced charge due to hole-movements towards cathode causes severe ballistic deficit. This phenomenon can be observed from the spectrum tailing (also called "hole tailing" for CdZnTe and "electron tailing" for a-Se) at low photon energies.

Several methods have been proposed to circumvent the problem of poor carrier mobility (e.g. poor hole mobility for CdZnTe and poor electron mobility for a-Se). They include 1) hemispherical detector structures, 2) pulse-shape discrimination and 3) charge loss correction. Hemispherical detector structures are only partially effective and their design are hard to realize for large-area pixilated two-dimensional (2D) architectures. Pulse-shape discrimination improves energy resolution but dramatically degrades detector efficiency (or sensitivity) and charge loss correction requires sophisticated readout electronics to perform proper correction and thus, dramatically limits its application in the field.

In one prior art embodiment, a radiation detector includes a grid, or contact, on its perimeter, or outer surface to assist in the charge collection process. The contact blocks charge induction from the motion of holes inside the radiation detector. However, this embodiment has only limited uses as the field that is created by the grid can not be guaranteed to be continuous which means that, for large detectors, the efficiency of the detector is reduced.

Furthermore, many current detectors are only capable of photon counting since they are limited to single pixilated operation Therefore, there is provided a novel radiation detector which overcomes disadvantages of prior art detectors.

SUMMARY OF THE INVENTION

The present invention is directed at a radiation detector which includes at least one semiconductor layer and at least one grid electrode sandwiched between a pair of electrode layers. The grid layer can either be embedded within one of the semiconductor layers or located between a pair of semiconductor layers and acts as an electrostatic shield to block any slow moving carriers or oppositely charged carriers from collecting in, or on, the collecting electrode. Use of the detector allows for photon counting for spectroscopy and integrating detectors to make TFT based imagers or CMOS imagers.

If the carriers being collected are negatively charged, such as electrons, the collecting electrode is an anode and therefore the common electrode is a cathode. Alternatively, if the carriers being collected are positively charged, such as holes, the collecting electrode is a cathode and the common electrode is the anode.

Typically, when an image is required, optical or xray photons are used. In order to create an image, the photons are directed towards a target whereby an image can be created based on the detected xray photons. Use of the detector allows for photon counting and/or integration for the signal retrieval.

The radiation detector operates in a manner similar to a Frisch grid structure which allows for slower moving carriers (either electrons or holes) to be blocked by the grid electrode so that the electrode collecting the carriers observes only fast moving carriers in order to provide a more accurate reading.

In an aspect of the invention, an internal grid electrode can be fully grown and then evaporated to serve the necessary functionality within the detector.

The location of the grid within the radiation detector provides an improved method of charge collection, and more specifically for direct conversion radiation detectors, such as amorphous Selenium (a-Se), lead Oxide or Mercuric Iodide type radiation detectors.

In a non-avalanche embodiment, the grid is placed as close to the charge collecting electrode layer as possible. In an avalanche embodiment, the grid is placed within a predetermined distance of the collecting electrode and closer to the collecting electrode than the common electrode. The predetermined distance is calculated based on the desired avalanche gain for a given high-voltage applied.

In one aspect, the grid is biased at a predetermined potential to reduce the variation in the induced charge on photon interaction depth inside the detector. The resolution and the signal-to-noise ratio of the radiation detector is also improved.

BRIEF DESCRIPTION OF THE DRAWINGS

Embodiments of the present invention will now be described, by way of example only, with reference to the attached Figures, wherein:

FIG. 3b to 3f are schematic diagram illustrating the method of FIG. 3a;

FIGS. 4b to 4g are schematic diagram illustrating the method of FIG. 4a;

DETAILED DESCRIPTION

Figure 1:
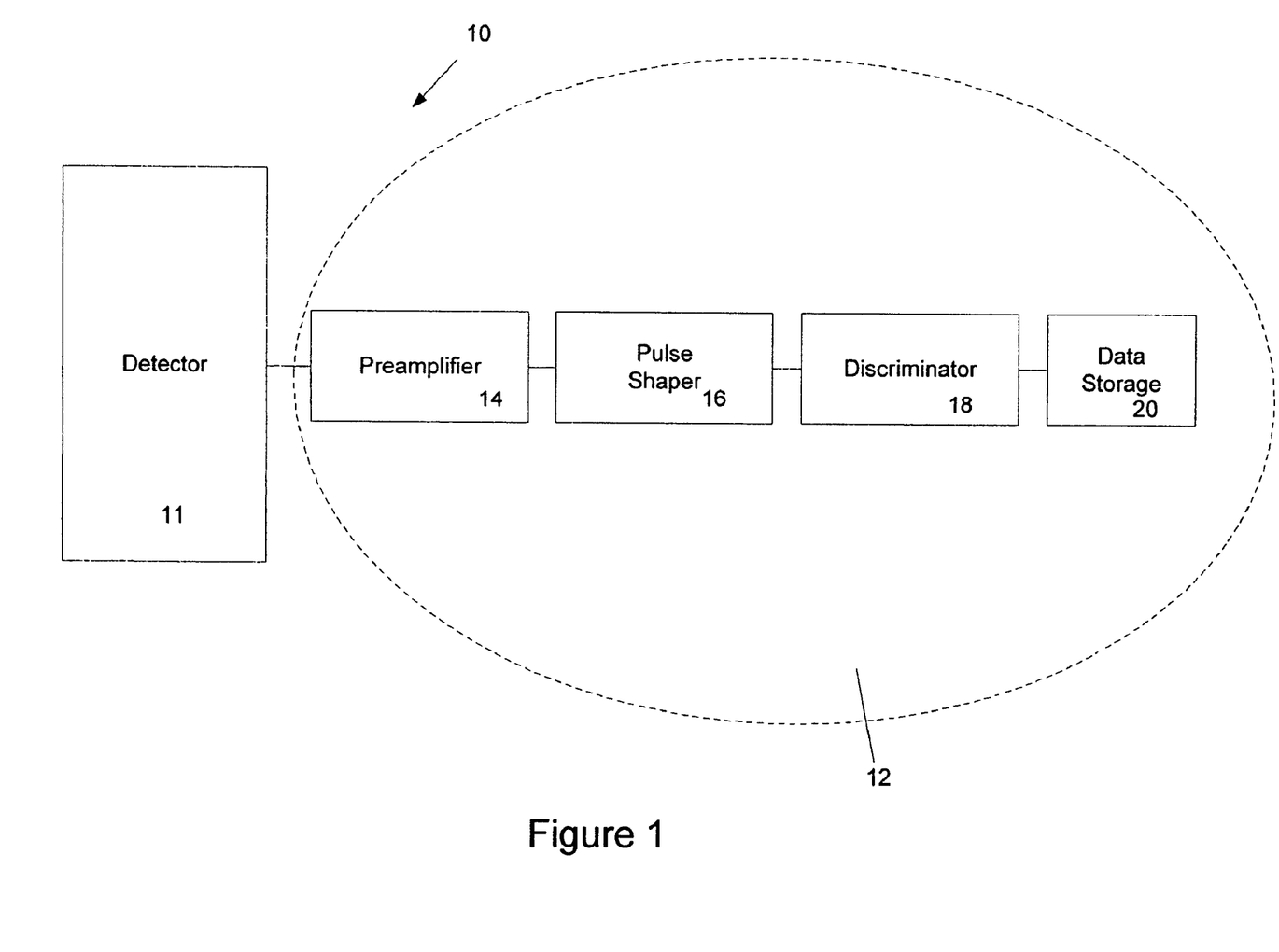
FIG. 1 is a schematic diagram of a system for charge sensing.

Turning to FIG. 1, an imager, or system for improving the resolution or performance of a semiconductor based radiation detector is shown. The system 10 includes a radiation detector portion 11 which is connected to a readout portion 12. In the current embodiment, which is used for photon counting, the embodiment is implemented using complementary metal-oxide semiconductor (CMOS) technology such that the readout portion 12 includes a preamplifier 14, a pulse shaper 16, a discriminator 18 and data storage 20. Alternatively, polycrystalline silicon technology can also be used for the readout portion 12.

Figure 8A:
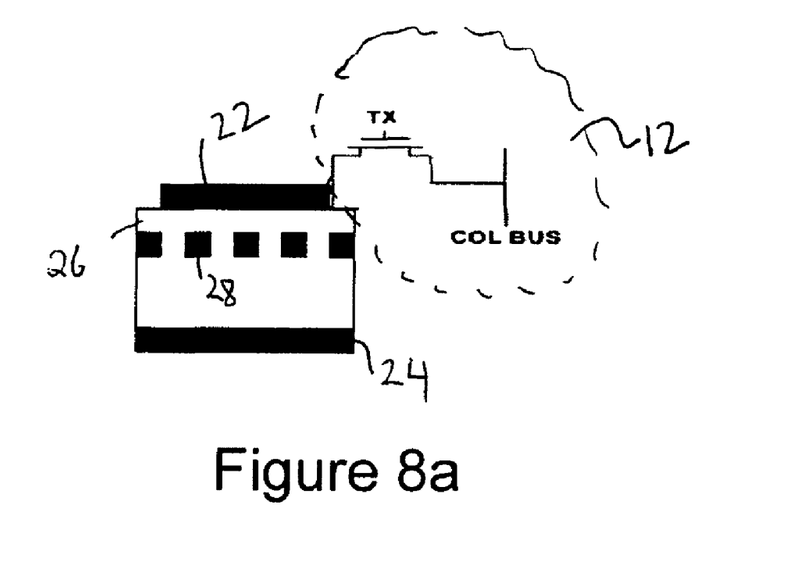
FIGS. 8a and 8b are schematic diagrams of integration mode imagers.
Figure 8B:
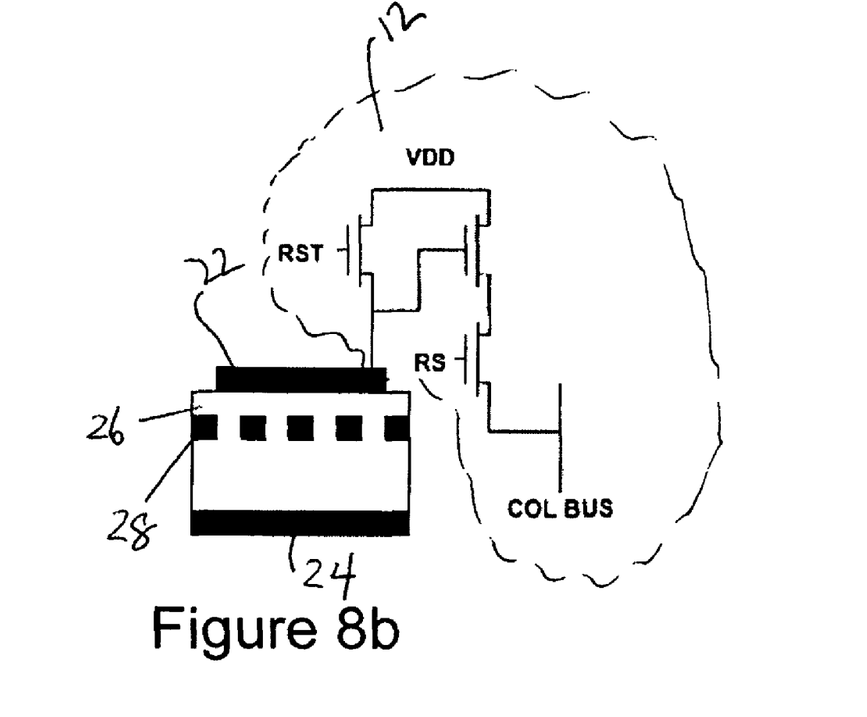

In an alternative embodiment, the readout portion 12 can also be used for integration, as the radiation detector improves on lag and potential ghosting. By masking out slow moving carriers, image lag can be reduced or eliminated thereby improving image quality and reducing the time necessary to acquire the image. A faster frame rate is also experienced which improves overall operation and enables 3D and real-time imaging The signal to noise ratio is also improved for both the photon counting and integration systems. In an integration system, the detector can be used in a passive pixel sensor (PPS) or an active pixel sensor (APS). Schematic diagrams of these sensors is shown in FIGS. 8a and 8b. Further operation of the readout portion 12 of the system will be well understood by one skilled in the art.

Figure 2A:
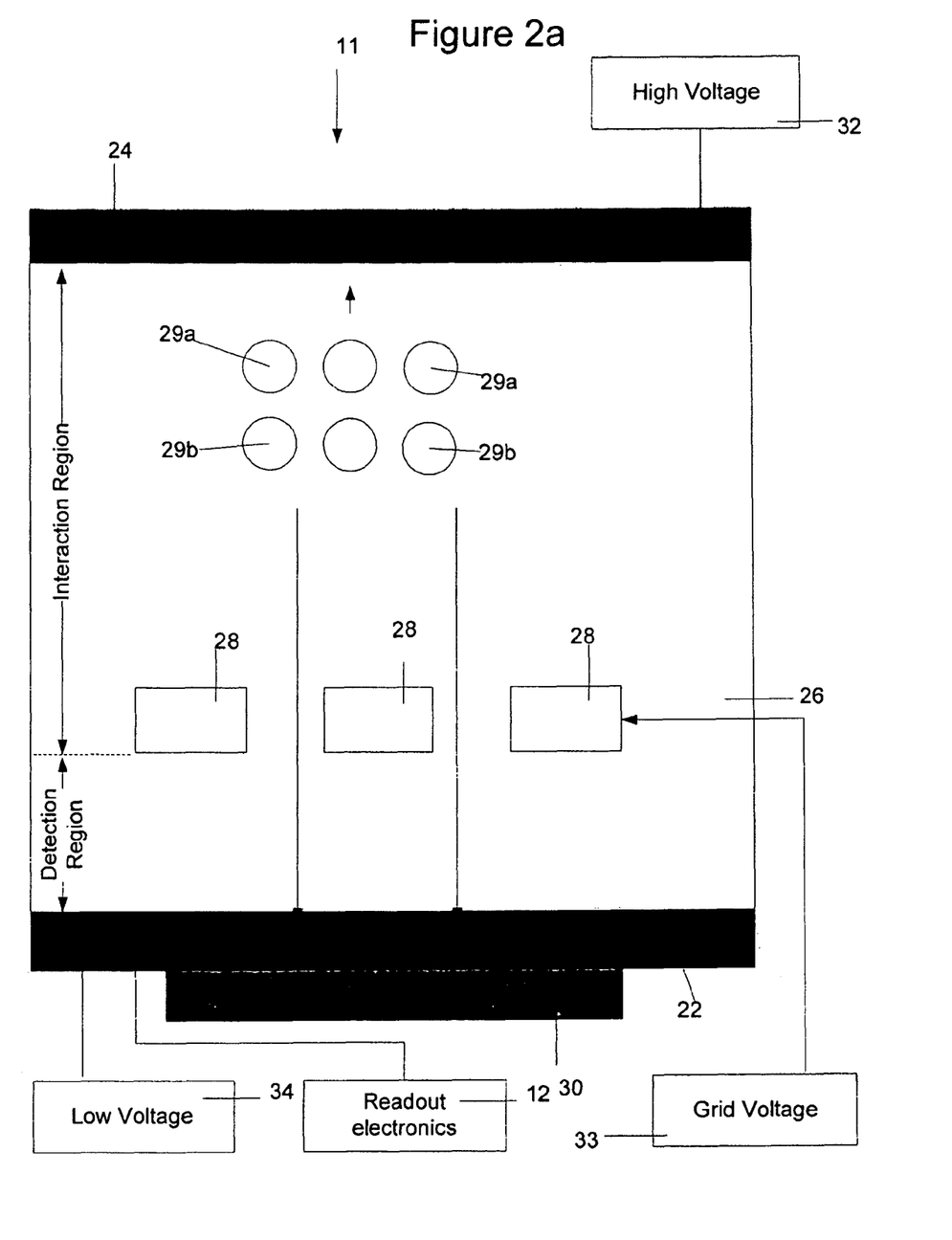
FIG. 2a is schematic diagram of a first embodiment of a radiation detector.

Turning to FIG. 2a, a more detailed schematic view of a first embodiment of the radiation detector 11 is shown. Typically, the radiation detector 11 is located atop a substrate layer 30, such as a thin film transistor (TFT) array or a CMOS electron pixilated array. In the preferred embodiment, the radiation detector 11 is used for a single polarity (electron-only or hole-only) physical or chemical vapour deposition (PVD) radiation detector with hybrid readout electronics in CMOS technology. Alternatively, the detector can be used with amorphous silicon or polycrystalline TFT electronics. The detector can also be used with evaporated detectors such as zinc oxide, or with photodiodes. Therefore, the detector can be used in any imager where detectors are "deposited", such as with nanocrystalline, microcrystalline, polycrystalline detectors.

Figure 5A:
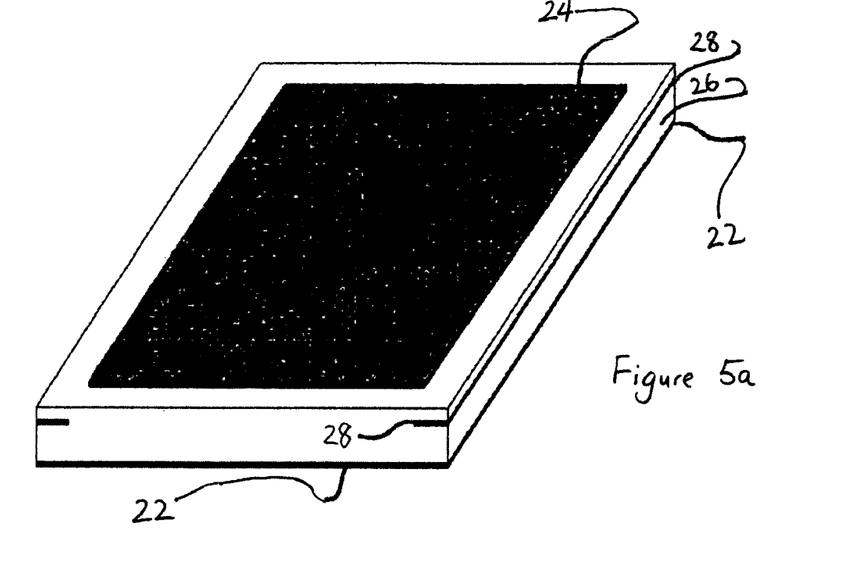
FIGS. 5a and 5b are schematic diagrams of a single detector and an array of detectors, respectively.
Figure 5B:
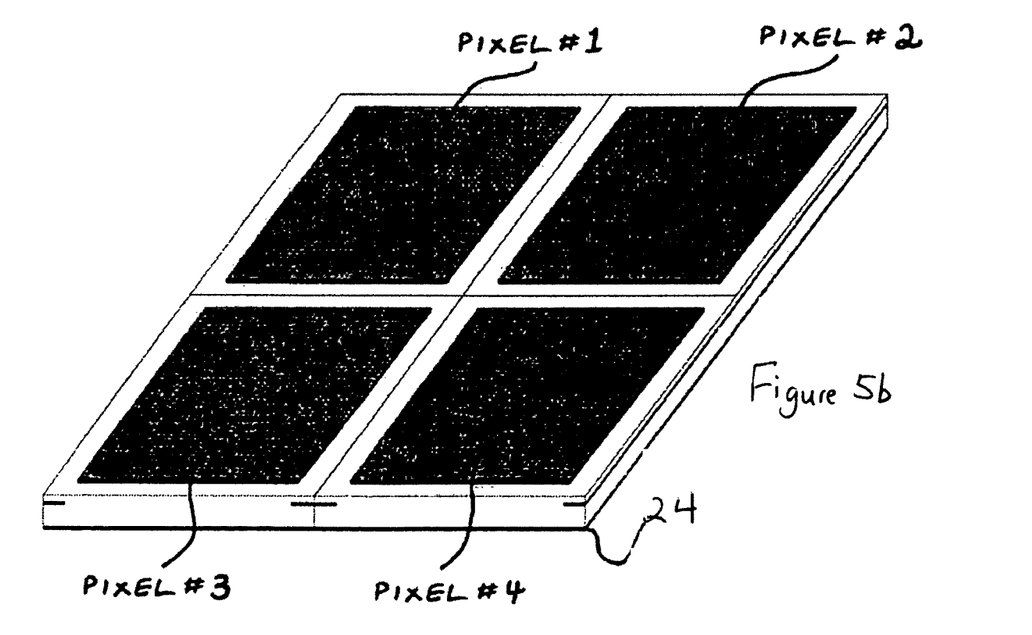
Figure 6A:
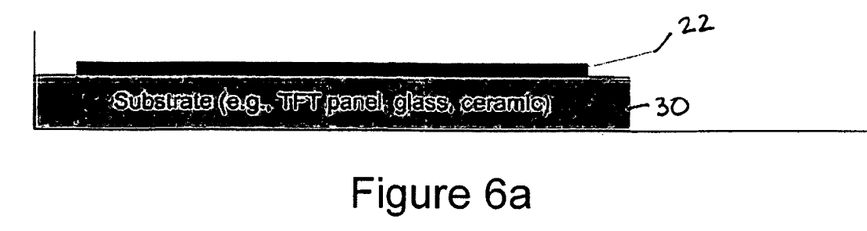
FIGS. 6a to 6e are schematic diagrams illustrating another method of radiation detector construction.
Figure 6B:
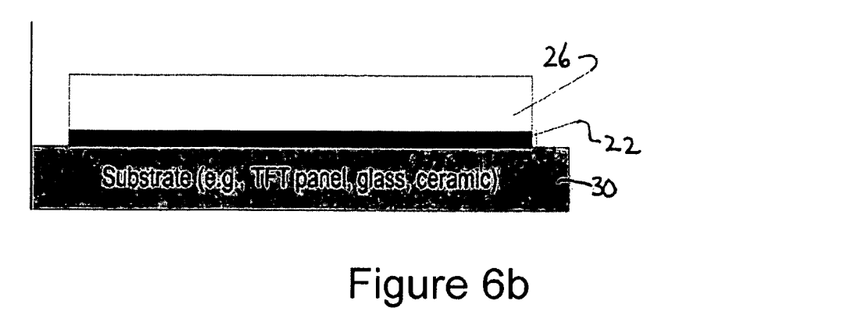
Figure 6C:
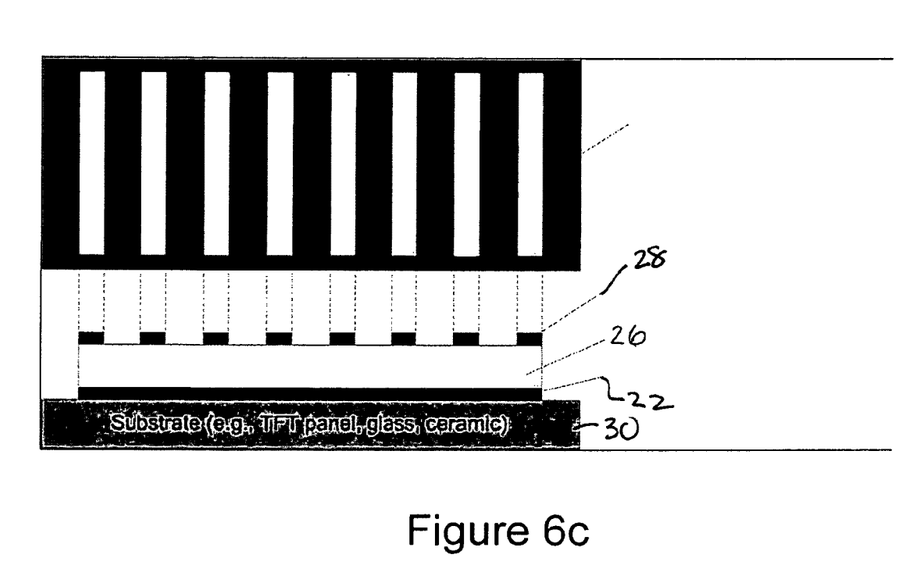
Figure 6D:
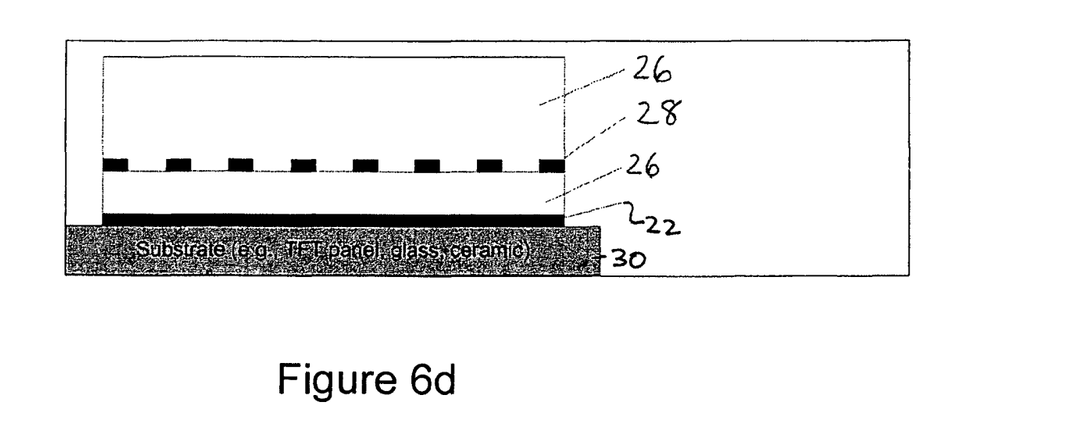
Figure 6E:
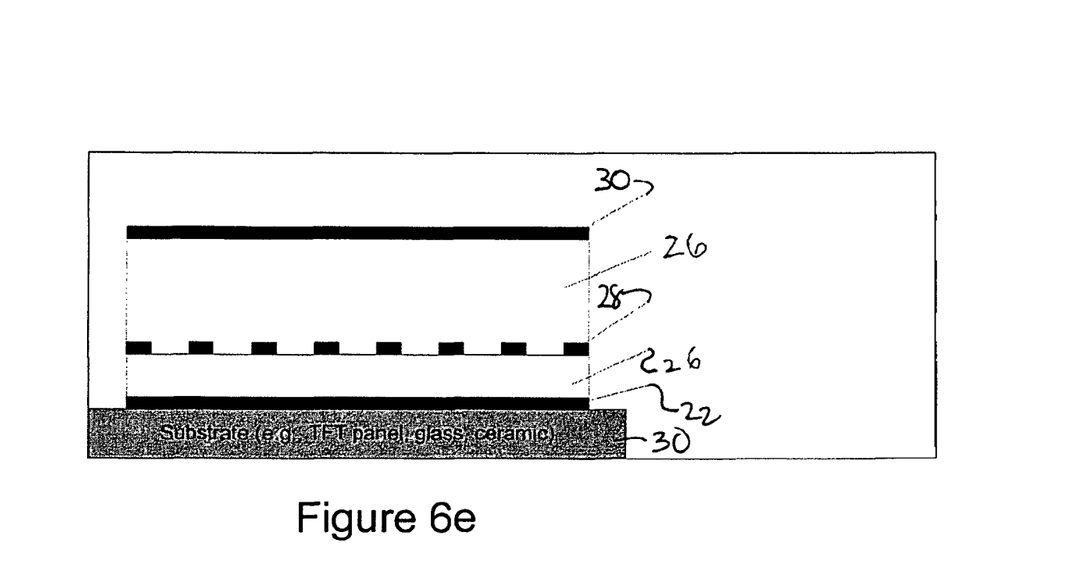
Figure 7A:
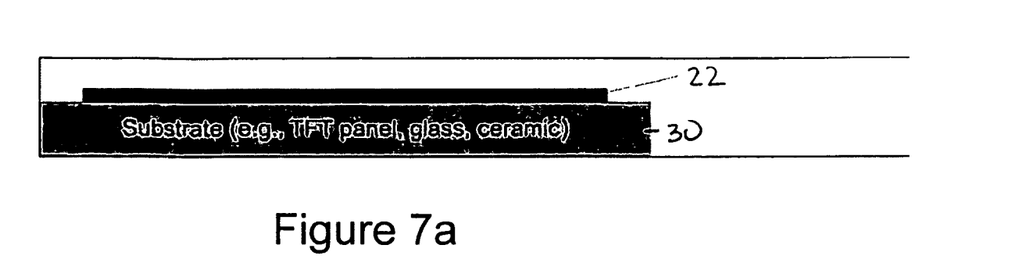
FIGS. 7a to 7f are schematic diagrams illustrating a further method of radiation detector construction.
Figure 7B:
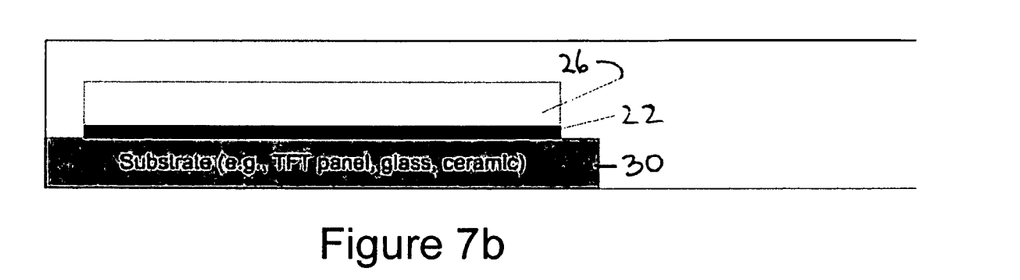
Figure 7C:
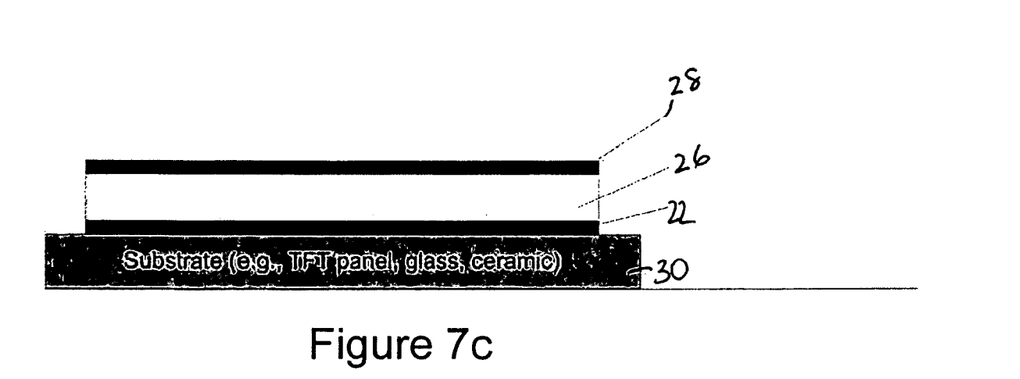
Figure 7D:
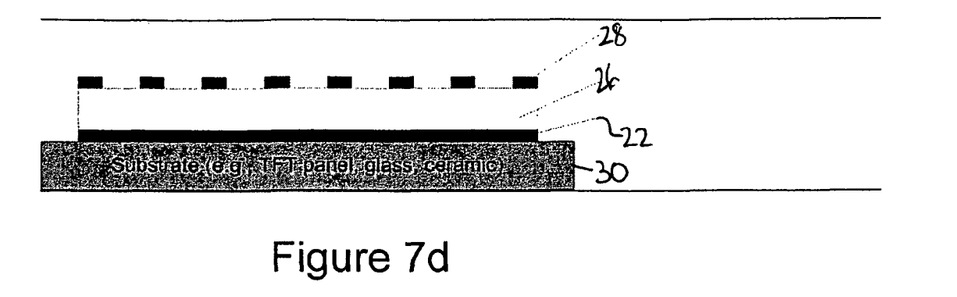
Figure 7E:
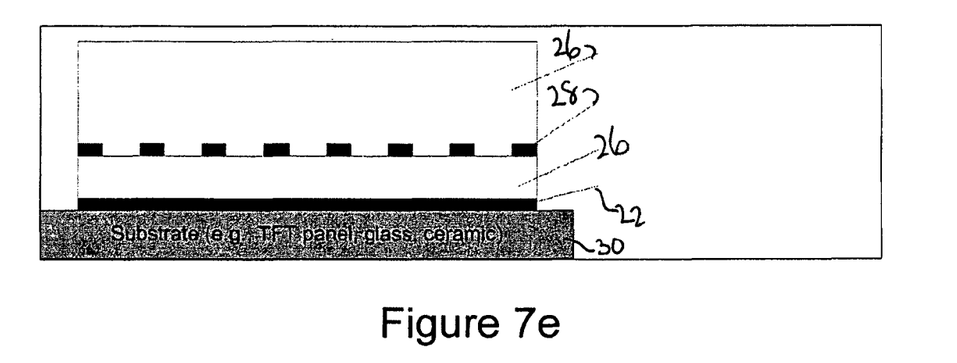
Figure 7F:
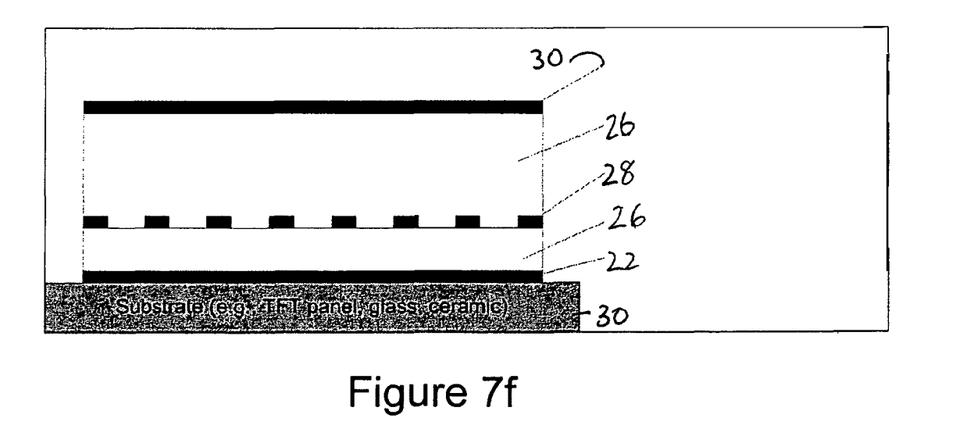

The radiation detector 11 includes a first, or pixel, or collecting, electrode layer 22, a second, or common, electrode layer 24, and a semiconductor layer 26. The pixel electrode 22 is connected to a low voltage 34 (such as 0V) and includes the necessary components to allow the radiation detector 11 to be connected to the readout electronics 12 so that the readout electronics 12 are able to determine the current in the detector. The common electrode 24 is shared among all detector pixels such that multiple detectors having a common second electrode layer can be created and is typically connected to a high voltage 32 such as 2000 V. Therefore, if there is an array of 20×20 individual radiation detectors, a single common electrode 24 can be used to cover the entire array of 400 detectors. Alternatively, each detector, or pixel, can have its own second electrode layer 24. In this embodiment, it will be understood that the individual common electrodes can be interconnected. These examples are schematically shown in FIGS. 5a and 5b. Depending on the design of the radiation detector 11, one of the electrode layers is the anode and the other is the cathode.

Located, or embedded, within the semiconductor layer 26 is a grid electrode 28, connected to a grid bias 33, which allows the detector to be separated into an interaction region (between the grid electrode and the common electrode layer 24) and a detection, or charge collection region, (between the grid electrode and the first electrode layer 22). The grid electrode 28, is used to assist in the charge collection process to block charge induction from the motion of slow carriers 29 (for example holes 29a in $HgI_2$ or electrons 29b in a-Se), as will be described in more detail below. It will be understood that the designation of holes and electrons can be switched depending on the electrode layers, i.e. whether the first electrode layer is an anode or a cathode.

Figure 2B:
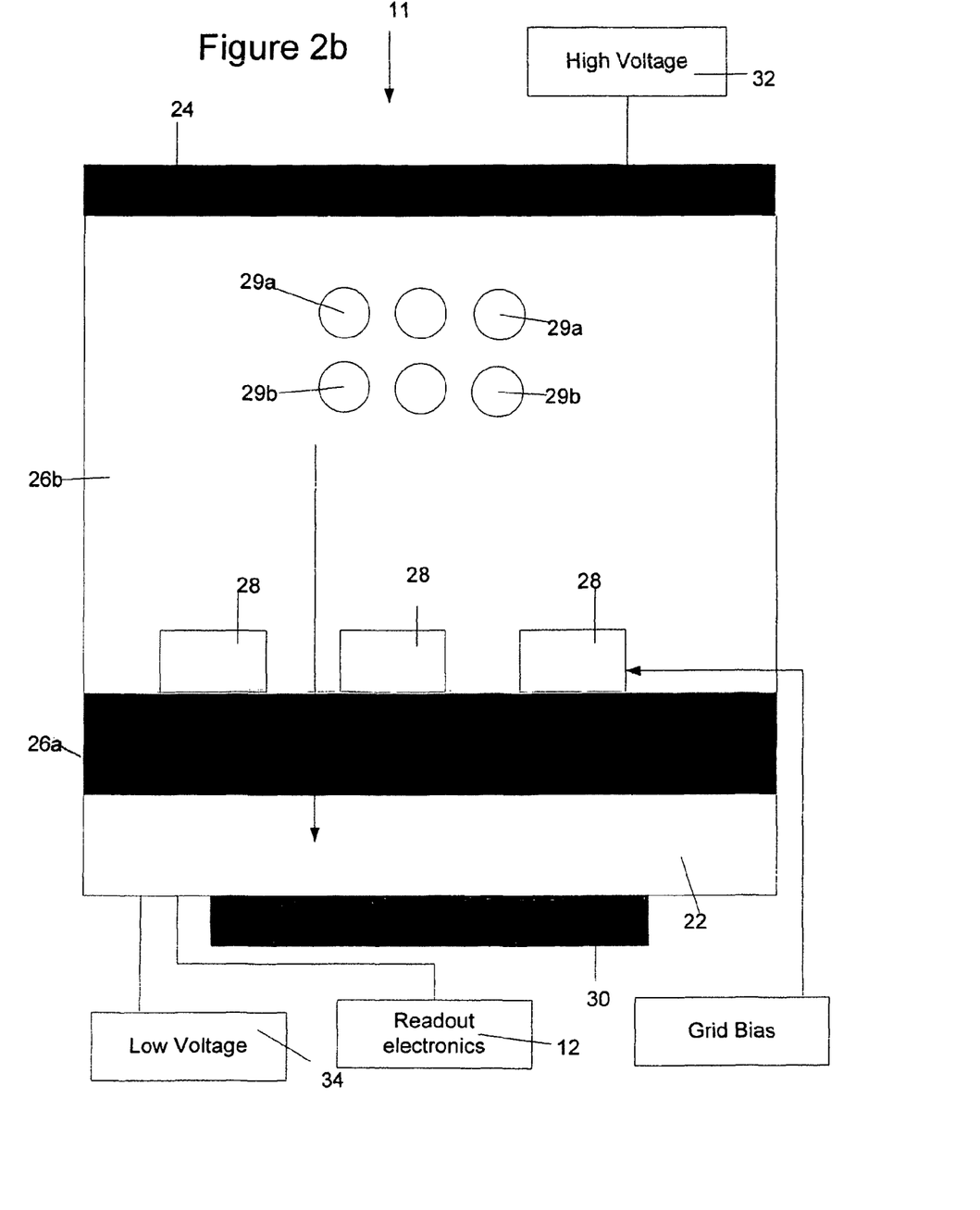
FIG. 2b is a schematic diagram of a second embodiment of a radiation detector.

Alternatively, as shown in FIG. 2b, there can be multiple semiconductor layers 26a and 26b. Although only two are shown, it will be understood that any number of semiconductor layers can be selected. In this embodiment, the grid electrode 28 is located between two semiconductor layers 26a and 26b, however, the grid electrode 28 can also be embedded within one of the two semiconductor layers, such as semiconductor layer 26a. While the radiation detector 11 can include any number of semiconductor layers, it must have at least one in order to provide the medium in which the carriers 29 travel.

With respect to the grid electrode 28, although only one is shown, any number of grid electrodes can be embedded within any one of the semiconductor layers or can be located between two semiconductor layers, however, the most beneficial location for at least one of the grid electrodes is to be as close as possible to the first electrode layer 22 (for non-avalanche operation) and at a predetermined distance (for avalanche operation). In this manner, there is a smaller area for charge collection whereby slower moving carriers can affect the reading by the readout electronics. The other grid electrodes can provide further barriers to slower moving carriers from entering the charge collection zone on the first electrode layer 22.

Alternatively, in a multiple grid embodiment, the bias of the grids and electrodes can be changed during operation to reverse the detector from an electron collecting detector to a hole collecting detector so that you have a detector capable of operating for hole or electron collecting.

Figure 3A:
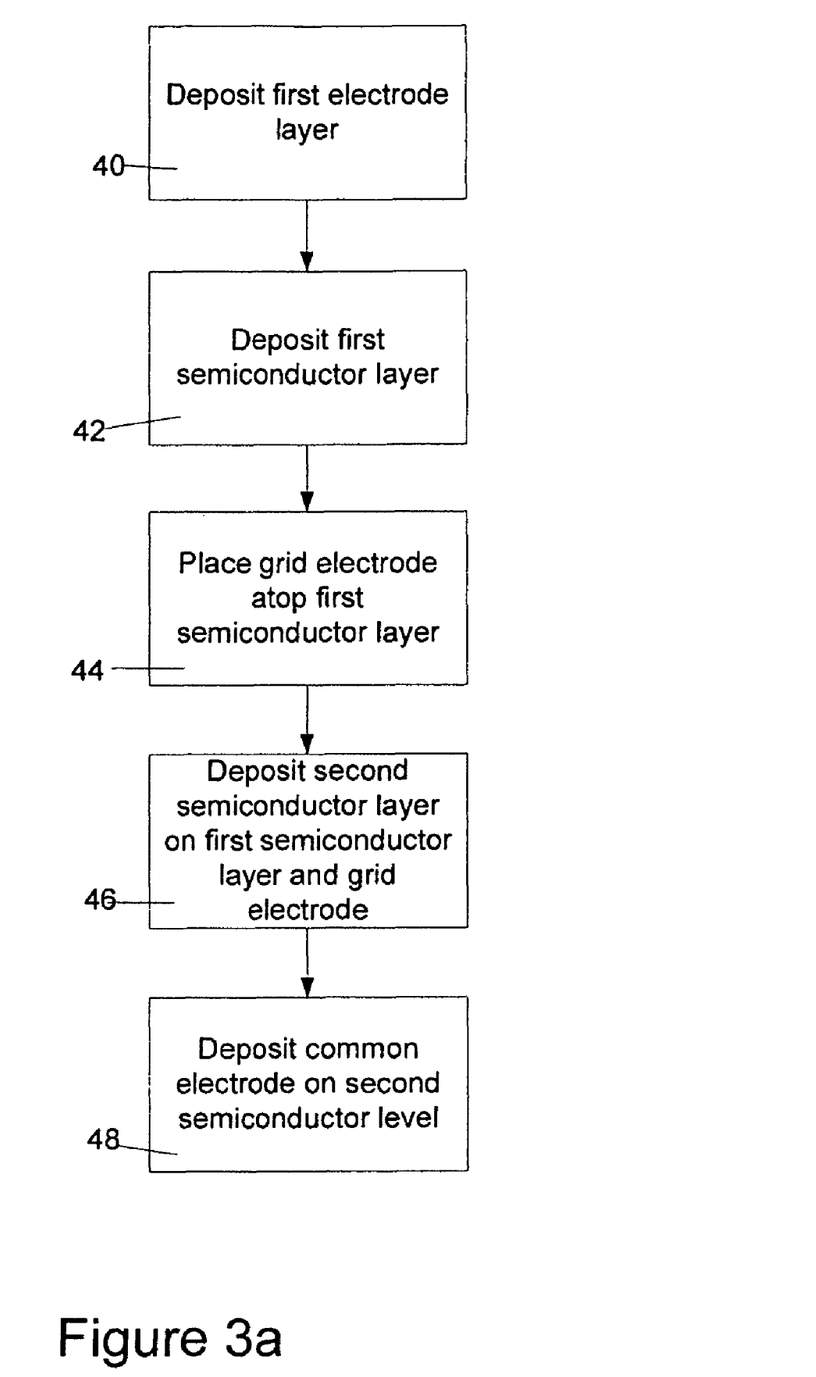
FIG. 3a is a flowchart outlining a first method of manufacturing a radiation detector.

Turning to FIG. 3a, a flowchart outlining a first method of creating a radiation detector is shown. FIGS. 3b to 3f are schematic diagrams representing the steps of the flowchart of FIG. 3a.

Figure 3B:
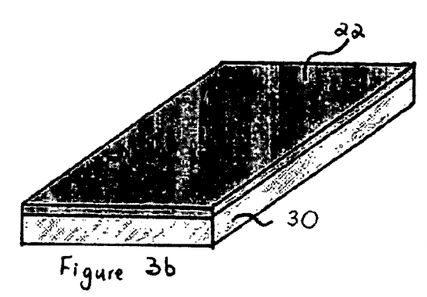
Figure 3C:
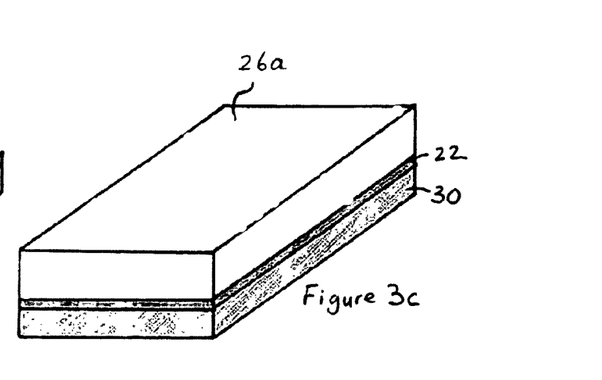
Figure 3D:
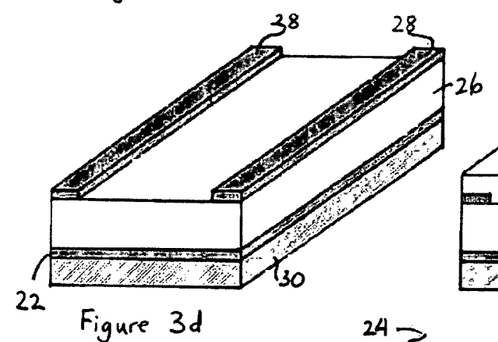
Figure 3E:
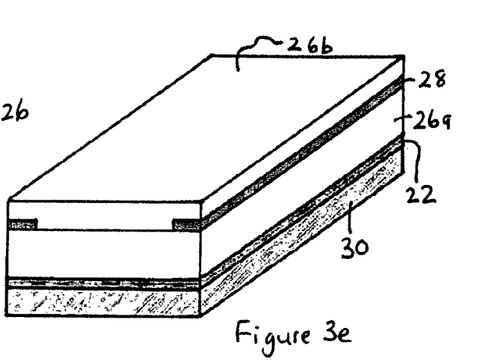
Figure 3F:
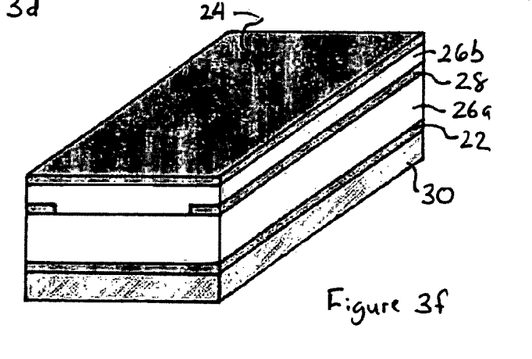

Assuming that a substrate layer 30 is already provided as a foundation for the radiation detector 11, the bottom, or first electrode, layer 22 is deposited atop the substrate layer 30 (step 40/FIG. 3b). In some embodiments, the substrate layer can be provided with the pixel electrode layer so that step 40 can be bypassed. A first semiconductor layer 26a is then deposited on top of the first electrode layer 22 (step 42/FIG. 3c). The grid electrode 28 is then placed on top of the first semiconductor layer 26a (step 44/FIG. 3d) and the second 26b semiconductor deposited on top of the first semiconductor layer 26a so that the grid layer 28 is embedded, or sandwiched, between the two semiconductor layers (step 46/FIG. 3e). Finally, the top electrode layer 24 is deposited on top of the second semiconductor layer 26b (step 48/FIG. 3f). FIG. 3f provides a schematic diagram of another embodiment of the radiation detector portion 11 for system 10.

As schematically shown in FIGS. 6a to 6e, in a shadow mask grid construction process, after the electrode layer is deposited on the substrate (step 40), a layer of semiconductor material, such as amorphous selenium, is deposited on the electrode layer (step 42). An internal grid can then be constructed by sputtering a conducting material, such as steel, aluminum or chromium, through a shadow mask, preferably metal, onto the semiconductor material (step 44). The shadow mask provides the desired patterning for the grid. A second layer of semiconductor material can then be deposited, such as by physical vapour deposition, over the grid 28 (step 46) and the first semiconductor layer so that the grid is between these two layers. The common electrode layer can then be deposited on top of the second semiconductor layer (step 48) using a technique such as sputtering.

As schematically shown in FIGS. 7a to 7f, in a lithography grid construction process, the first electrode layer and the first semiconductor layers are deposited as disclosed above (steps 40 and 42). The internal grid can then be constructed (step 44) by depositing an intermediate electrode layer over the first semiconductor layer and then patterning the intermediate electrode using photolithography. The second semiconductor layer and the second electrode can then be deposited on to (steps 46 and 48).

Figure 4A:
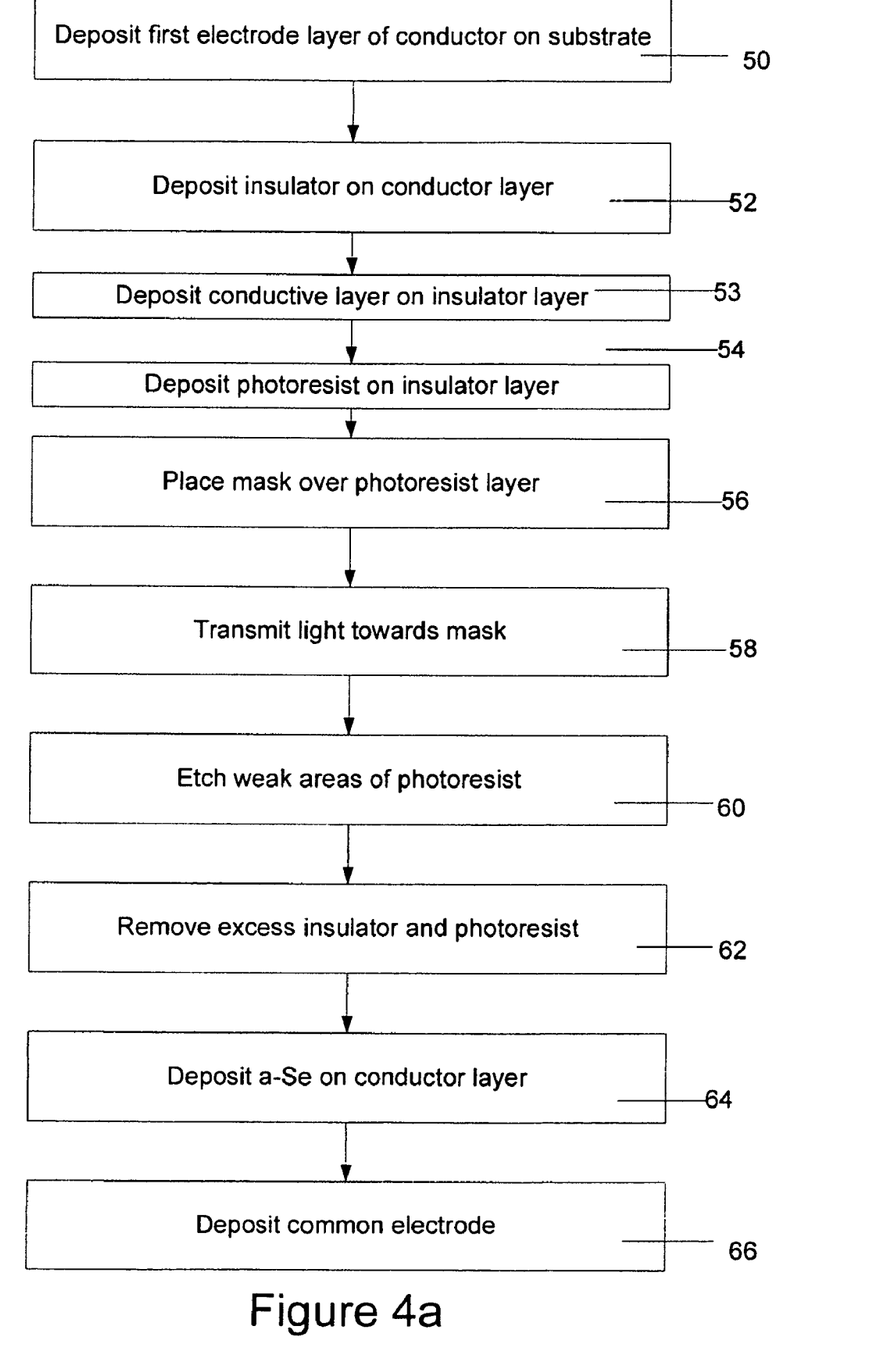
FIG. 4a is a flowchart outlining a second method of manufacturing a radiation detector.
Figure 4B:
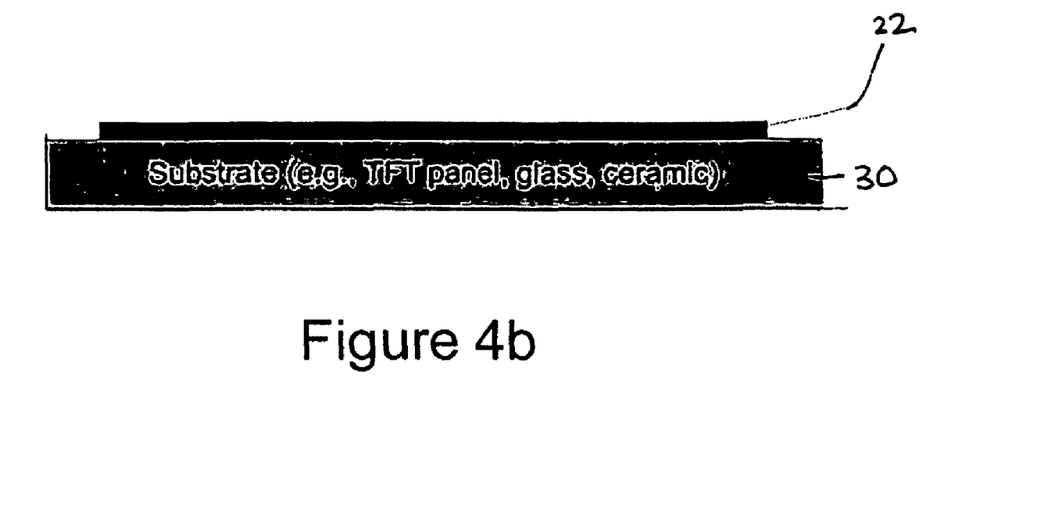
Figure 4C:
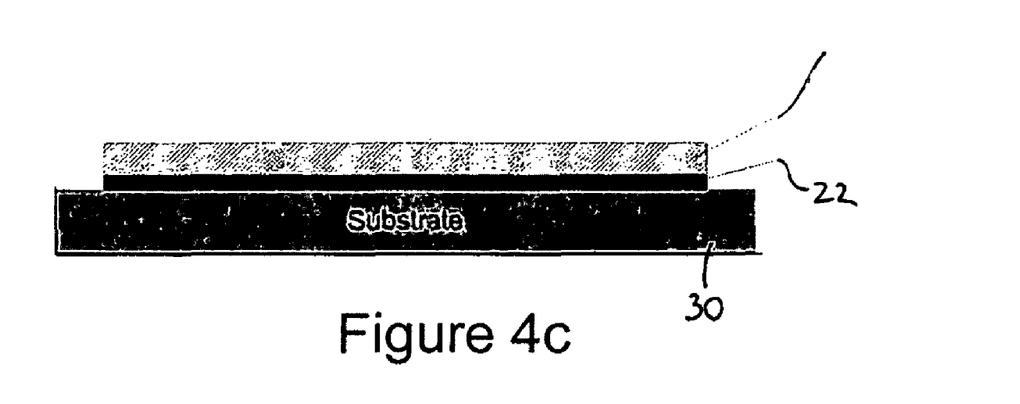
Figure 4D:
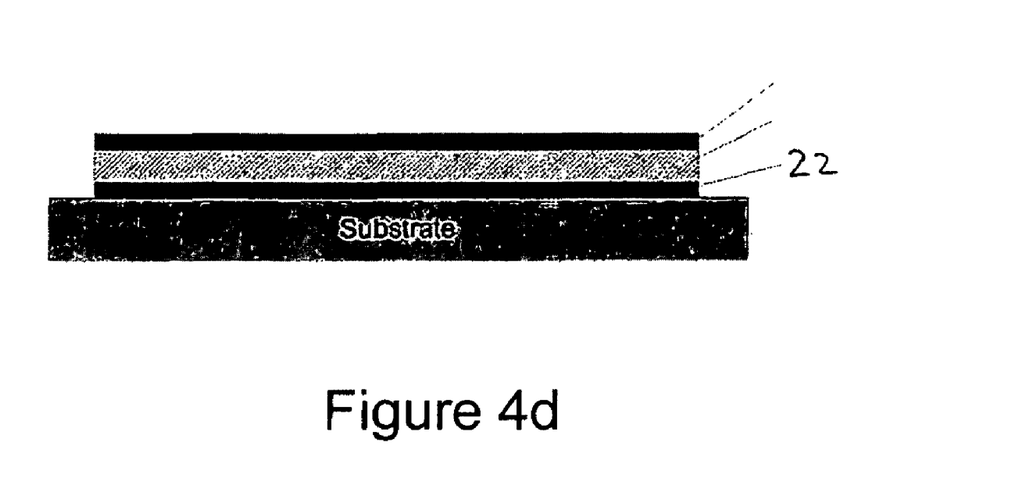
Figure 4E:
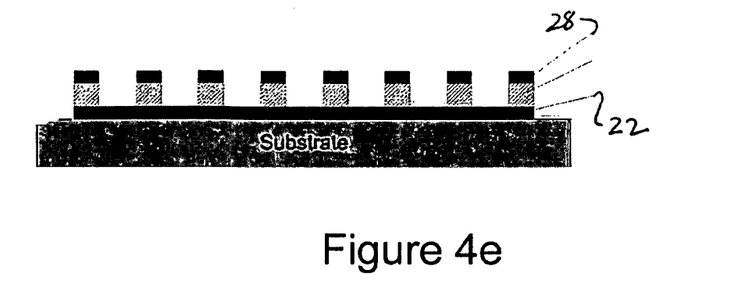
Figure 4F:
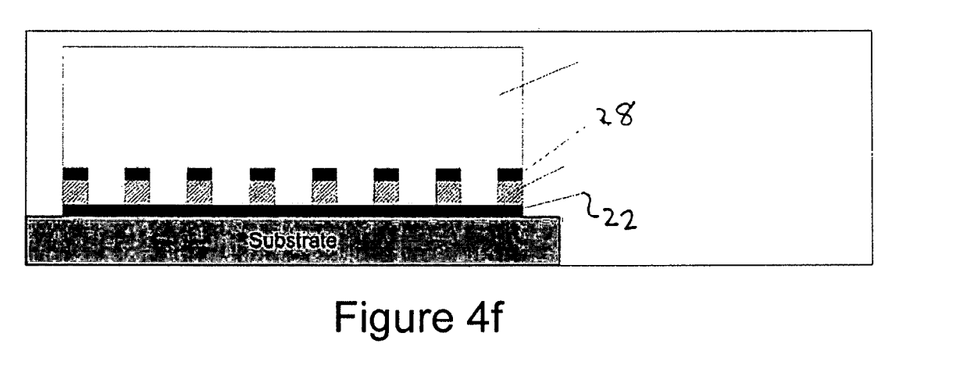
Figure 4G:
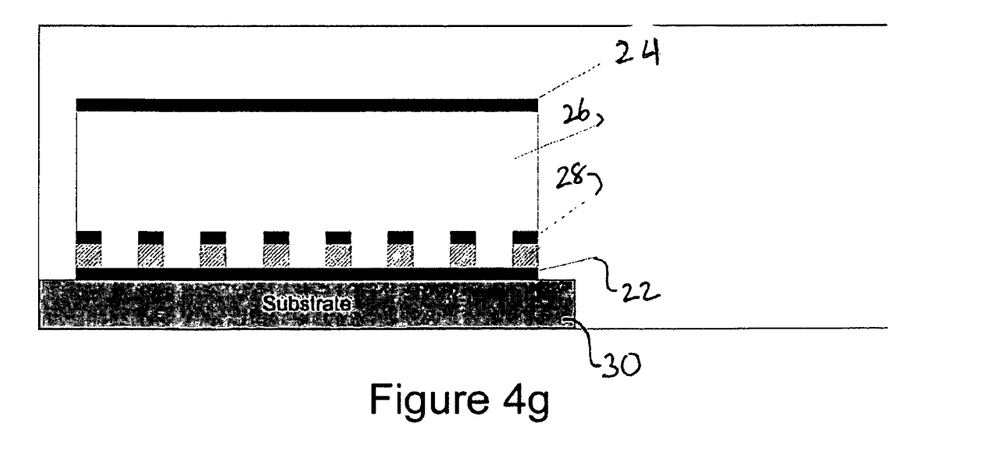

Turning to FIG. 4a, a flowchart outlining a more detailed method of producing a system for improving the performance of a semiconductor radiation detector is shown. FIGS. 4b to 4f provide schematic diagrams illustrating various steps of the method. Firstly, a substrate material, such as glass, is selected and used as a substrate layer and then a conductor, or conductive layer, such as a transparent conductive oxide (TCO), which can be Indium Tin Oxide (ITO), layer can then be deposited on top of the substrate layer (step 50) which acts as the first electrode layer 22. As previously discussed, the substrate can already include the pixel electrode so that there is no need to deposit a conductive layer on the substrate and this step can be bypassed.

An insulator layer can then be deposited onto the ITO layer (step 52), via a Plasma Enhanced Chemical Vapour Deposition (PECVD) process. The insulator can be, but is not limited to Silicon Nitride ($SiN_x$) where x can be any number, silicon oxide or low-K dielectrics. A conductive layer such as aluminum, copper or doped semiconductor layer is then deposited on top of the insulator layer (step 53). This conductive layer serves as the grid electrode as will be explained below.

After the insulator and conductive layers are deposited, patterning via photolithography can be performed to create a grid electrode with predetermined, or desired, dimensions. To assist in the photolithography process, a photoresist layer, or the like, is deposited on top of the insulator and conductive layers (step 54). While many processes for depositing the photoresist layer are known, in the preferred embodiment, the photoresist is deposited using a spin coating procedure which allows for a uniform thickness of photoresist to be produced and deposited over the surface of the insulator and conductive layers.

In order to produce the grid electrode, in one embodiment, a photolithographic mask is required. A further piece of glass with chrome can be used to design a mask to define the grid electrode 28. In order to produce the mask for photolithography, the grid can be designed by removing chrome from the glass in the desired pattern. The design of the pattern can be in any format as there is no need for the grid to be aligned with the electrodes in the first electrode layer 22. In one embodiment, the chrome is removed using a process such as lithography. In another, a shadow mask can be used.

After the mask has been completed, it can be placed atop the photoresist layer (step 56) using a mask aligner. Light, in the form of ultraviolet (UV) rays can be then shone on the mask (step 58), whereby the presence of the chrome blocks this light and at locations where the chrome has been removed, the UV light passes through the piece of glass ton the photoresist. Therefore, at the locations where the UV light hits the photoresist layer, the photoresist layer is then weakened. After this has been completed, the mask is removed. The detector can then be placed in a developer's solution so that etching can occur (step 60) whereby the weak areas (the areas which were saturated with UV rays) are removed due to the reaction of the photoresist layer with the solution.

This combination is then placed in a second solution to remove the insulator from the weakened areas before the photoresist is washed away (step 62). Amorphous Selenium, lead oxide, mercuric iodide or the like can then be deposited atop the remaining insulator and conductor layers (step 64) to provide a second semiconductor layer before the common electrode is placed atop this semiconductor layer (step 66). If desired, prior to the common electrode layer being deposited, other grids electrodes or semiconductor layers can be deposited.

In operation, after the radiation detector 11 has been created, predetermined potential, seen as the high 32 and low voltages 34, are applied to the electrode layers 22 and 24 and a grid bias 33 is applied to the grid electrode(s) 28. The carriers 29 within the semiconductor layer 26, or layers, then start moving towards their expected target electrode. As will be understood, this is the anode for negatively charged carriers and the cathode for positively charged carriers.

Assuming that the negatively charged carriers (electrons) are being collected, this means that the first electrode layer 22 is the anode and the second electrode 24, or common electrode, is the cathode. The grid electrode 28 is therefore located near the anode electrode 22. As the carriers travel within the semiconductor layer(s), the electrons travel towards the anode and the holes travel towards the cathode. The faster moving electrons pass by the grid towards the anode, thereby providing a signal for the readout electronics while the slower moving electrons are blocked, or shielded, by the grid electrode 28 so that they do not affect the charge collection (or transmit a weak signal) in order to provide a more accurate reading. The oppositely charged carriers (holes) travel away from the anode electrode and are either collected by the grid electrode 28 or pass through on its way towards the cathode, or second electrode layer 24. However, these holes are not a factor in the charge collection as they are moving away from the anode. Alternatively, if holes are being collected, the same discussion applies in a reverse manner whereby the grid 28 shields the first electrode (cathode) from seeing a current pulse until the fast moving hole carriers pass the grid. After the holes passes the grid, the readout electronics are able to see the current pulse/signal more clearly thereby providing a more accurate reading.

In an alternative embodiment, the grid can be implemented by growing nano-tubes. In another embodiment, the detector can be used with a-Se, TFT and single stage selenium deposition, compatible with existing TFT technology so there is no need to add a mask thereby providing instant compatibility An advantage of the radiation detector described above is that since the grid 28 is placed within the detector 11, it has a more direct effect on the charge collection process to provide a more accurate reading. Furthermore, as the grid is being used to simply shield slower moving carriers, the grid 28 does not have to be aligned with the readout electronics of the substrate so there is no restriction on the design of the mask/grid electrode. Also, the grid is physically deposited onto a semiconductor layer and not mounted to a periphery of the detector.

In an alternative embodiment, the detector can be use with lead oxide or mercuric iodide imagers. These images provide higher conversion gains and a better stopping power. Also, there is no need for a voltage power supply for these type of imagers. In a further embodiment, the grid can be dynamically biased so that provided the necessary readout electronics are in place, the detector can be used as either an electron collector or a hole collector.

While the embodiments described herein are directed to particular implementations, it will be understood that modifications and variations to these embodiments are within the scope and sphere of the present application. Many other modifications and variations may occur to those skilled in the art. All such modifications and variations are believed to be within the sphere and scope of the present application.

What is claimed is:

1. A radiation detector comprising:
a first electrode layer;
at least one grid electrode;
a second electrode layer;
at least one semiconductor layer, deposited, via a deposition process, between the first and second electrode layers; and
wherein the at least one grid electrode is embedded in one of the at least one semiconductor layers.

2. The radiation detector of claim 1 wherein there are two semiconductor layers and one grid electrode and the grid electrode is located between the first and second semiconductor layers.

3. The radiation detector of claim 1 further comprising a substrate layer located beneath the first electrode layer.

4. The radiation detector of claim 3 wherein the substrate further comprises readout electronics.

5. The radiation detector of claim 4 wherein the substrate is a thin film transistor (TFT) array or a CMOS electronic pixel array.

6. The radiation detector of claim 5 wherein the TFT array is made of amorphous silicon, polycrystalline silicon or Cadmium Selenide.

7. The radiation detector of claim 5 wherein the CMOS electronic pixel array is a crystalline silicon CMOS electronic pixel array.

8. The radiation detector of claim 5 wherein the array is not aligned with the grid electrode.

9. The detector of claim 1 wherein the deposition process is one of physical vapor deposition, chemical vapor deposition, plasma enhanced chemical vapor deposition.

10. A method of creating a radiation detector comprising:
depositing a first electrode layer, on top of a substrate;
depositing a semiconductor layer or insulator layer on top of the first electrode layer;
embedding a grid electrode within the semiconductor layer;
depositing a second electrode layer, on top of the semiconductor layer.

11. The method of claim 10 wherein depositing a first electrode layer comprises depositing a layer of transparent conductive oxide, metal or doped semi-conductor, or Indium Tin Oxide (ITO).

12. The method of claim 10 wherein embedding comprises:
depositing a conductive layer on the semiconductor layer or insulator layer; and
patterning the conductive layer.

13. The method of claim 12 further including:
patterning the semiconductor layer or the insulator layer.

14. The method of claim 13 wherein patterning comprises:
using photolithography or a shadow mask.

15. The method of claim 13 wherein patterning comprises:
depositing a photoresist layer over at least one of the semiconductor layer or conductive layer;
placing a mask over the photoresist layer;
transmitting ultraviolet light towards the mask; and
etching weak areas of photoresist layer created by the transmission of light.

* * * * *